(12) United States Patent
O'Connell

(10) Patent No.: US 9,556,030 B2
(45) Date of Patent: Jan. 31, 2017

(54) SULFUR RECOVERY UNIT

(71) Applicant: Saudi Arabian Oil Company, Dhahran (SA)

(72) Inventor: John P. O'Connell, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 14/535,428

(22) Filed: Nov. 7, 2014

(65) Prior Publication Data

US 2015/0132213 A1    May 14, 2015

Related U.S. Application Data

(60) Provisional application No. 61/901,515, filed on Nov. 8, 2013.

(51) Int. Cl.
   *B01J 12/00*    (2006.01)
   *C01B 17/04*   (2006.01)
   (Continued)

(52) U.S. Cl.
   CPC ........... *C01B 17/0456* (2013.01); *B01D 53/52* (2013.01); *B01J 19/245* (2013.01); *C01B 17/04* (2013.01);
   (Continued)

(58) Field of Classification Search
   CPC ......... C01B 17/0404; B01J 12/00; B01J 12/02
   See application file for complete search history.

(56) References Cited

U.S. PATENT DOCUMENTS 2,765,217 A   10/1956  Conroy, Jr. et al.
3,822,341 A    7/1974  Smith
(Continued)

FOREIGN PATENT DOCUMENTS

CN    101239705 A    8/2008
CN    102580882 A    7/2012
(Continued)

OTHER PUBLICATIONS

Connock, L.; Approaching the Limit 99.9+% Sulphur Recovery; Sulphur; Jul. 1998-Aug. 1998; p. 34-55; vol. 17, Issue 257.
(Continued)

*Primary Examiner* — Timothy Vanoy
(74) *Attorney, Agent, or Firm* — Bracewell LLP; Constance Gall Rhebergen

(57) ABSTRACT

A sulfur recovery unit for processing an acid gas feed to recover elemental sulfur, the sulfur recovery unit comprising a reaction furnace configured to burn the acid gas feed, an oxygen source, and a fuel gas to create a furnace outlet stream, the acid gas feed comprises hydrogen sulfide which is converted to elemental sulfur, a waste heat boiler configured to capture heat from the furnace outlet stream to create a cooled stream, a condenser configured to condense the cooled stream to produce a waste gas stream and a condensed stream comprising elemental sulfur, a thermal oxidizer configured to burn the waste gas stream to create a sulfur dioxide rich stream, and a sulfur dioxide scrubbing unit configured to remove the amount of sulfur dioxide from the sulfur dioxide rich stream to create an effluent stream and a recycle stream recycled to the reaction furnace.

15 Claims, 1 Drawing Sheet

(51) Int. Cl.
*B01J 19/24* (2006.01)
*B01D 53/52* (2006.01)
(52) U.S. Cl.
CPC ...... *B01D 2257/304* (2013.01); *B01J 2219/24* (2013.01); *Y02P 20/129* (2015.11)

(56) References Cited

U.S. PATENT DOCUMENTS

| | | |
|---|---|---|
| 4,113,849 A | 9/1978 | Atwood |
| 4,756,900 A | 7/1988 | Pendergraft et al. |
| 4,795,620 A | 1/1989 | Heisel et al. |
| 5,628,977 A | 5/1997 | Heisel et al. |
| 5,965,100 A | 10/1999 | Khanmamedov |
| 6,645,459 B2 | 11/2003 | Lynn |
| 6,776,974 B1 | 8/2004 | Burmaster et al. |
| 2009/0226364 A1 | 9/2009 | Tekie et al. |
| 2011/0008229 A1 | 1/2011 | Iyengar et al. |
| 2011/0300059 A1 | 12/2011 | Zhai et al. |

FOREIGN PATENT DOCUMENTS

| | | | |
|---|---|---|---|
| EP | 0 568 980 A1 | 11/1993 | |
| GB | 2466047 A | * 6/2010 | ............. B01D 53/50 |

OTHER PUBLICATIONS

Nagpal, S.; Re-Evaluate Recycling Options for the Claus Unit: This Simulation-Based Study Finds That Significant Sulfur Recovery Capacity is Attainable Through Recycling; Hydrocarbon Processing; Oct. 20, 2005; pp. 101-105; vol. 84, Issue 10.
PCT International Search Report and the Written Opinion; dated Feb. 24, 2015; International Application No. PCT/US2014/064473; International File Date: Nov. 7, 2014.

* cited by examiner

SULFUR RECOVERY UNIT

CROSS-REFERENCE TO RELATED PATENT APPLICATIONS

This patent application claims priority from U.S. Provisional Application No. 61/901,515 filed on Nov. 8, 2013. For purposes of United States patent practice, this application incorporates the contents of the Provisional Application by reference in its entirety.

BACKGROUND OF THE INVENTION

Field of the Invention

This invention relates to an apparatus and process for recovery of elemental sulfur. More specifically, this invention provides an apparatus and process for recovery of elemental sulfur and removal of sulfur-containing contaminants from an acid gas stream.

Background of the Invention

The sulfur recovery industry has been using the Claus gas phase reactions as the basis for recovering elemental sulfur from hydrogen sulfide ($H_2S$) since the 1940s. The Claus plant, the long-standing 'workhorse' of the industry, uses the Claus chemistry to achieve between 96% and 98% recovery of elemental sulfur from the $H_2S$ in an acid gas streams. The gas phase elemental sulfur from the Claus plant is subsequently condensed and recovered in the liquid form.

The vast majority of all operating Claus plants worldwide include a thermal stage (i.e. a free-flame reaction furnace and a wasteheat boiler) followed by either 2 or 3 catalytic converters or catalytic stages that result in recovery efficiencies of 96% for a 2-stage design or 98% for a 3-stage design. There are only a handful of 4-stage designs in the world because early on the sulfur recovery industry recognized that a $4^{th}$ catalytic stage only marginally increased the recovery efficiency above 98% and was therefore uneconomical.

Owing to the negative impact of acid rain, formed due to high levels of sulfur dioxide ($SO_2$) in the atmosphere, emissions controls required limits on the amount of $SO_2$ emitted in the effluent of the Claus plants. In response, the industry began developing Tail Gas Treatment (TGT) technologies to be placed immediately downstream of the Claus plant to further improve the recovery efficiency of the sulfur recovery unit to above 99%, or in some cases above 99.9%, while removing $SO_2$ from the effluent.

By far the most common combination of Claus plant and TGT for achieving greater than 99.9% recovery is a Claus plant followed by a reduction/absorption amine-based technology. This technology requires the reduction and hydrolysis of sulfur bearing compounds back to the form of $H_2S$ to allow for absorption in an amine contactor. The $H_2S$ that is absorbed into the amine is then regenerated and sent back to the front end of the Claus plant as a recycle acid gas stream.

In addition to recovering elemental sulfur, Claus plants also destroy contaminants present in acid gas streams. Contaminants include $C_1$-$C_{6+}$ hydrocarbons, benzene, toluene, ethyl benzene, and xylene (BTEX), methanol ($CH_3OH$), and ammonia ($NH_3$). The thermal stage of the Claus plant plays a critical role in the destruction of these contaminants. If these contaminants are not properly destroyed in the thermal stage they will negatively impact the purity of the sulfur product and can cause problems in the downstream units and even possibly end up being emitted to the atmosphere.

While the Claus plant does provide a path for recovery of sulfur, it is not without drawbacks. The catalytic stages require regeneration due to catalyst fouling and plugging. The regeneration can take significant downtime, potentially putting the entire processing unit offline. The catalytic stages are sensitive to the presence of contaminants and to the temperature of the catalytic feed stream. These sensitivities can make controlling the catalytic stages cumbersome.

A process which achieves a greater than 99% recovery of sulfur without the presence of the catalytic stages is desirable. In addition, a process that provides a minimal equipment list, reduced plot plan, and ease of operation, including increased reliability is desired.

SUMMARY OF THE INVENTION

This invention relates to an apparatus and process for recovery of elemental sulfur. More specifically, this invention provides an apparatus and process for recovery of elemental sulfur and removal of sulfur-containing compounds from an acid gas stream.

In a first aspect of the present invention, a sulfur recovery unit for processing an acid gas feed to recover elemental sulfur is provided. The sulfur recovery unit includes a reaction furnace, the reaction furnace configured to burn the acid gas feed, an oxygen source, and a fuel gas to create a furnace outlet stream, the reaction furnace includes a main burner and a reaction chamber, the main burner is configured to heat the acid gas feed, the oxygen source, and the fuel gas to a minimum reaction temperature, where the acid gas feed includes hydrogen sulfide, where the hydrogen sulfide is converted to elemental sulfur in the reaction chamber. The sulfur recovery unit further includes a waste heat boiler fluidly connected to the reaction furnace, the waste heat boiler configured to capture heat from the furnace outlet stream to create a cooled stream, where the heat captured from the furnace outlet stream is operable to heat a water feed to create steam, a condenser fluidly connected to the waste heat boiler, the condenser configured to condense the cooled stream to produce a waste gas stream and a condensed stream, where the waste gas stream includes sulfur-containing contaminants, and where the condensed stream includes the elemental sulfur, a thermal oxidizer fluidly connected to the condenser, the thermal oxidizer configured to burn the waste gas stream, the oxygen source, and the fuel gas to create a sulfur dioxide rich stream, where a conversion of the sulfur-containing contaminants to sulfur dioxide is operable to occur in the thermal oxidizer, where the sulfur dioxide rich stream includes the sulfur dioxide, and a sulfur dioxide scrubbing unit fluidly connected to the thermal oxidizer, the sulfur dioxide scrubbing unit configured to remove an amount of sulfur dioxide from the sulfur dioxide rich stream to create an effluent stream and a recycle stream, the recycle stream containing the amount of sulfur dioxide, where the recycle stream is recycled to the reaction furnace.

In certain embodiments, the minimum reaction temperature is between 1000° C. and 1250° C. In certain embodiments, the oxygen source is selected from the group consisting of air, oxygen enriched air, and pure oxygen. In certain embodiments, the cooled stream is at a temperature of 300° C. In certain embodiments, a temperature of the waste gas stream is between 125° C. and 150° C. In certain embodiments, the oxygen source provides a stoichiometric excess of oxygen in the thermal oxidizer, wherein the stoichiometric excess of oxygen promotes the conversion of the sulfur-containing contaminants to the sulfur dioxide. In certain embodiments, the amount of sulfur dioxide is greater than 99.9% by volume of the recycle stream. In certain embodiments, the recycle stream provides a stoichiometric ratio in the reaction furnace of the hydrogen sulfide to the sulfur dioxide of 2:1.

In a second aspect of the present invention, a sulfur recovery process to recover elemental sulfur from an acid gas feed is provided. The sulfur recovery process includes the steps of feeding the acid gas feed, an oxygen source, and a fuel gas to a main burner of a reaction furnace, the main burner configured to heat the acid gas feed, an oxygen source, and a fuel gas source to a minimum reaction temperature, the acid gas feed having hydrogen sulfide, converting the acid gas feed, the oxygen source, and the fuel gas at the minimum reaction temperature to create a furnace outlet stream, where the furnace outlet stream includes elemental sulfur and sulfur-containing contaminants, recovering heat from the furnace outlet stream in a waste heat boiler to create a cooled stream, the waste heat boiler configured to capture heat from the furnace outlet stream to heat a water feed to create steam, condensing the cooled stream in a condenser to produce a condensed stream and a waste gas stream, the condensed stream containing the elemental sulfur, the waste gas stream containing the sulfur-containing contaminants, combusting the waste gas stream, the oxygen source, and the fuel gas in a thermal oxidizer to create a sulfur dioxide rich stream, the sulfur dioxide rich stream containing sulfur dioxide, where a conversion of the sulfur-containing contaminants in the waste gas stream to the sulfur dioxide is operable to occur, feeding the sulfur dioxide rich stream to a sulfur dioxide scrubbing unit, the sulfur dioxide scrubbing unit configured to remove an amount of sulfur dioxide from the sulfur dioxide rich stream to create a recycle stream and an effluent stream, wherein the recycle stream includes the amount of sulfur dioxide, and recycling the recycle stream to the main burner of the reaction furnace.

In certain aspects of the present invention, the minimum reaction temperature is between 1000° C. and 1250° C. In certain aspects of the present invention, the oxygen source is selected from the group consisting of air, oxygen enriched air, and pure oxygen. In certain aspects of the present invention, the cooled stream is at a temperature of 300° C. In certain aspects of the present invention, a temperature of the waste gas stream is between 125° C. and 150° C. In certain aspects of the present invention, the oxygen source provides a stoichiometric excess of oxygen in the thermal oxidizer, wherein the stoichiometric excess of oxygen promotes the conversion of the sulfur-containing contaminants to the sulfur dioxide. In certain aspects of the present invention, the amount of sulfur dioxide is greater than 99.9% by volume of the recycle stream. In certain aspects of the present invention, the recycle stream provides a stoichiometric ratio in the reaction furnace of the hydrogen sulfide to the sulfur dioxide of 2:1.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

Figure 1:
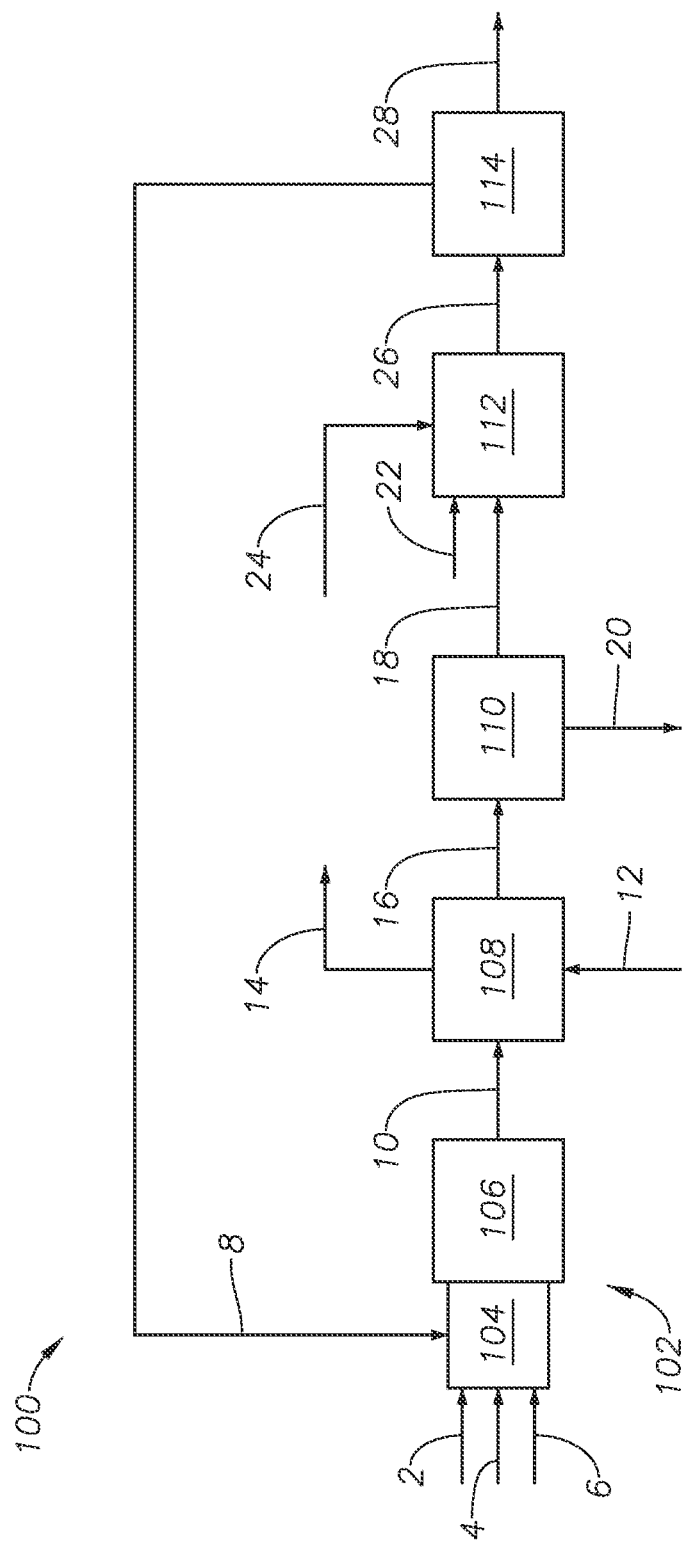
FIG. 1 is a process diagram of an embodiment of the present invention.

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Referring to FIG. 1, a process diagram of an embodiment of elemental sulfur recovery unit 100 is provided. Oxygen source 2, fuel gas 4, and acid gas feed 6 are fed to main burner 104 of reaction furnace 102. Reaction furnace 102 is a free-flame reaction furnace suitable to combust $H_2S$ and other components. Oxygen source 2 can be any oxygen ($O_2$) containing gas suitable for use in reaction furnace 102. Exemplary gases suitable for use as oxygen source 2 include air, $O_2$ enriched air, pure $O_2$, or any combination thereof. In at least one embodiment of the present invention, oxygen source 2 is air. In at least one embodiment of the present invention, oxygen source 2 is provided such that $O_2$ is in stoichiometric excess relative to the $H_2S$ present in acid gas feed 6.

Fuel gas 4 can be any fuel gas suitable for co-firing in reaction furnace 106. Fuel gas 4 provides additional fuel to increase and/or maintain the temperature in main burner 104. In at least one embodiment of the present invention, fuel gas 4 is natural gas. In at least one embodiment of the present invention, fuel gas 4 includes $C_1$-$C_{6+}$ hydrocarbons. In at least one embodiment of the present invention, sulfur recovery unit 100 operates in the absence of fuel gas 4.

Acid gas feed 6 can be from any source. Acid gas feed 6 contains $H_2S$, process gases, process contaminants, and sulfur-containing contaminants. Process gases include carbon monoxide (CO), carbon dioxide ($CO_2$), water ($H_2O$), nitrogen ($N_2$), hydrogen ($H_2$). Process contaminants can include hydrocarbons, BTEX, $CH_3OH$, and $NH_3$. Sulfur-containing contaminants can include carbonyl sulfide (COS), carbon disulfide ($CS_2$), mercaptans and others. The nature and composition of process gases, process contaminants, and sulfur-containing contaminants depends on the process that is the source for acid gas feed 6. The precise composition of acid gas feed 6 depends upon the source and can be determined using any technology capable of analyzing the composition of an acid gas feed stream. In at least one embodiment of the present invention, the source of acid gas feed 6 is a refinery, and acid gas feed 6 includes $NH_3$. In an alternate embodiment of the present invention, the source of acid gas feed 6 is a sour gas plant and acid gas feed 6 is in the absence of $NH_3$. In at least one embodiment of the present invention, there are no limits to the amount of $H_2S$ that can be present in acid gas feed 6.

Reaction furnace 102 is designed and operated to convert $H_2S$ and the sulfur-containing contaminants to sulfur-conversion products. Sulfur-conversion products include elemental sulfur, $SO_2$, and other sulfur-containing contaminants. Reaction furnace 102 is designed and operated to destroy the process contaminants. The temperature of reaction furnace 102 affects the sulfur-conversion products present in furnace outlet stream 10 and the amount of process contaminants that are destroyed. Main burner 104 heats oxygen source 2, fuel gas 4, and acid gas feed 6 to a minimum reaction temperature. The minimum reaction temperature is a function of the composition of acid gas feed 6. The minimum reaction temperature is in the range of about 850° C. to about 1300° C. In at least one embodiment, acid gas feed 6 is in the absence of $NH_3$ and the minimum reaction temperature is at least about 1000° C. In at least one embodiment of the present invention, acid gas feed 6 includes $NH_3$ and the minimum reaction temperature is 1250° C. In at least one embodiment of the present invention, reaction furnace 102 is in the absence of catalyst.

In some embodiments, preheating units are added upstream of main burner 104. In at least one embodiment, acid gas feed 6 is preheated. In at least one embodiment of the present invention, oxygen source 2 is air, which is preheated. The concentration of oxygen in main burner 104 affects the temperature. The addition of fuel gas 4 increases the temperature in main burner 104. The need for preheating units and the ratio of oxygen and fuel gas to acid gas feed 6 depends on the concentration of $H_2S$ in acid gas feed 6.

Oxygen source 2, fuel gas 4, and acid gas feed 6 are heated in main burner 104 before passing to reaction chamber 106. The bulk of the conversion of $H_2S$ and the sulfur-containing contaminants to elemental sulfur (as vapor) and other sulfur-conversion products occurs in reaction chamber 106. The conversion of $H_2S$ to elemental sulfur occurs according to the following reactions:

$$2H_2S+3O_2 \rightarrow 2SO_2+2H_2O$$

$$2H_2S+SO_2 \rightarrow 3S+2H_2O \quad \text{(Claus reaction)}$$

The conversion of $H_2S$ and the sulfur-containing contaminants entering reaction chamber 106 to elemental sulfur is between about 55 mol % and about 85 mol %, alternately between about 60 mol % and about 80 mol %, alternately between about 65 mol % and 75 mol %, alternately between about 68 mol % and 72 mol %. The conversion of $H_2S$ to elemental sulfur occurs in the absence of catalyst.

The bulk of destruction reactions of process contaminants occurs in reaction chamber 106. The process contaminants present in acid gas feed 6 are reduced by about 95 wt %, alternately by about 97 wt %, alternately by about 99 wt %, alternately by about 99.5 wt %, alternately by about 99.9 wt %.

Furnace outlet stream 10 exits reaction chamber 106 at the minimum reaction temperature and is cooled prior to further processing. In at least one embodiment of the present invention, the heat energy of furnace outlet stream 10 is recovered and used to heat other streams or process units in the system. Furnace outlet stream 10 leaves reaction chamber 106 and enters waste heat boiler 108. Waste heat boiler 108 captures heat energy from furnace outlet stream 10 and uses the captured heat energy to heat water feed 12 to generate steam 14. Waste heat boiler 108 can be configured to generate steam at any process conditions desirable. Waste heat boiler 108 can be configured to generate high pressure steam. In at least one embodiment of the present invention, steam 14 is high pressure saturated steam at a pressure of 600 psi. The amount of heat energy captured from furnace outlet stream 10 controls the temperature of cooled stream 16. In a preferred embodiment of the present invention, the temperature of cooled stream 16 is between 295° C. and 305° C. It at least one embodiment of the present invention, waste heat boiler 108 is a shell and tube exchanger.

Furnace outlet stream 10 and cooled stream 16 contain $H_2S$, $SO_2$, elemental sulfur, process gases, process contaminants, and sulfur-containing contaminants. The exact composition of furnace outlet stream 10 and cooled stream 16 depends on the composition of acid gas feed 6 and the conditions in reaction furnace 102, including the minimum reaction temperature. The amount of $H_2S$, process contaminants, and sulfur-containing contaminants present in furnace outlet stream 10 and cooled stream 16 are reduced relative to the amount of those components present in acid gas feed 6. In at least one embodiment of the present invention, oxygen source 4 is air and argon (Ar) is present in furnace outlet stream 10 and cooled stream 16.

Cooled stream 16 is fed to condenser 110. Condenser 110 further reduces the temperature of cooled stream 16 causing the elemental sulfur to condense as condensed stream 20. The temperature of condensed stream 20 is between about 120° C. and about 155° C., alternately between about 125° C. and about 150° C. Condensed stream 20 contains greater than about 95 wt % elemental sulfur, alternately greater than about 97 wt % elemental sulfur, alternately greater than about 99 wt % elemental sulfur, alternately greater than about 99.5 wt % elemental sulfur, and alternately greater than about 99.9 wt % elemental sulfur.

The other components present in cooled stream 16, that do not condense as part of condensed stream 20, exit condenser 110 in waste gas stream 18. Exemplary components present in waste gas stream 18 include $H_2S$, $SO_2$, elemental sulfur, process gases, process contaminants, and sulfur-containing contaminants. The exact composition of waste gas stream 18 depends on the composition of cooled stream 16. In at least one embodiment of the present invention, waste gas stream 18 contains less than about 1% by volume elemental sulfur.

In at least one embodiment of the present invention, condenser 110 can be used to capture heat energy from cooled stream 16 to heat a water stream (not shown) to create a steam stream (not shown). In at least one embodiment of the present invention, the steam stream is a low pressure saturated steam at a pressure of 125 psi.

Waste gas stream 18 is fed to thermal oxidizer 112. Oxygen source 22 and fuel gas 24 are also fed to thermal oxidizer 112. Oxygen source 22 can be the same source or a different source as oxygen source 2. Oxygen source 22 provides oxygen to thermal oxidizer 112 in stoichiometric excess to sulfur-containing contaminants present in waste gas stream 18. Fuel gas 24 can be the same source of fuel gas as fuel gas 4 or a different source of fuel gas. Thermal oxidizer 112 combusts the sulfur-containing contaminants in the presence of excess $O_2$ to create $SO_2$ along with other combustion products to create sulfur dioxide rich stream 26. Sulfur dioxide rich stream 26 contains $SO_2$, process gases, and trace amounts of contaminants. Sulfur dioxide rich stream 26 has a reduced amount of sulfur-containing contaminants relative to waste gas stream 18. In at least one embodiment of the present invention, elemental sulfur present in waste gas stream 18 is converted to $SO_2$ in thermal oxidizer 112. Thermal oxidizer 112 operates a temperature between about 1000° C. and about 1200° C., alternately between about 1050° C. and about 1150° C., and alternately between about 1075° C. and about 1125° C. In at least one embodiment of the present invention, thermal oxidizer 112 operates at a temperature of about 1100° C. In at least one embodiment of the present invention, thermal oxidizer 112 is in the absence of catalyst.

In at least one embodiment of the present invention, sulfur dioxide rich stream 26 is cooled (not shown) prior to entering sulfur dioxide scrubbing unit 114. Any heat exchanger capable of cooling sulfur dioxide rich stream 26 can be used. Sulfur dioxide rich stream 26 is fed to sulfur dioxide scrubbing unit 114 to create recycle stream 8 and effluent stream 28. Sulfur dioxide scrubbing unit 114 can be any type of scrubbing unit capable of removing an amount of $SO_2$ from a process stream. Effluent stream 28 contains process gases, $SO_2$, and trace levels of contaminants. Effluent stream 28 contains $SO_2$ in an amount less than about 1% by volume, alternately less than about 0.1% by volume, alternately less than about 0.01% by volume, alternately less than about 0.001% by volume, alternately less than 0.0001% by volume, alternately less than about 0.00005% by volume, alternately less than 0.00001% by volume. Effluent stream 28 can be sent for further processing, vented to atmosphere, or used in another processing unit. In at least one embodiment of the present invention, effluent stream 28 is vented to atmosphere.

Recycle stream 8 contains the amount of $SO_2$ removed from sulfur dioxide rich stream 26. In at least one embodiment of the present invention, the amount of $SO_2$ is greater than about 99.9% by volume of the $SO_2$ generated in thermal oxidizer 112. Recycle stream 8 is recycled to main burner 104 of reaction furnace 102. In at least one embodiment of the present invention, recycle stream 8 is fed to main burner 104 to maintain a stoichiometric ratio of $H_2S$ to $SO_2$ of about 4:1 and alternately about 2:1 in reaction furnace 102. The ratio of $H_2S$ to $SO_2$ in reaction furnace 102 contributes to the overall conversion of $H_2S$ and sulfur-containing contaminants to elemental sulfur. In at least one embodiment of the present invention, elemental sulfur recovery unit 100 can be operated in the absence of limits on the volumetric flow rate of recycle stream 8.

Various process control elements can be included in the process to provide for better control of the process units and the overall conversion of $H_2S$ and sulfur-containing contaminants to elemental sulfur. A tail gas analyzer (not shown) can be installed after condenser 110 to analyze the composition in waste gas stream 18. In at least one embodiment, the tail gas analyzer results can be used to adjust the flow rate of oxygen source 2. A temperature sensor (not shown) can be included in reaction furnace 102. In at least one embodiment of the present invention, the temperature sensor can be used to adjust the flow rate of fuel gas 4 as needed to maintain or reach the minimum reaction temperature.

The overall conversion of $H_2S$ and sulfur-containing contaminants to elemental sulfur is greater than about 99 mol %, alternately greater than about 99.2 mol %, alternately greater than about 99.4 mol %, alternately greater than about 99.6 mol % alternately greater than about 99.8 mol %, alternately greater than about 99.9 mol %.

Although the present invention has been described with respect to certain features, it should be understood that the features and embodiments of the features can be combined with other features and embodiments of the features.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made herein.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A sulfur recovery unit for processing an acid gas feed to recover elemental sulfur, the sulfur recovery unit comprising:
    a reaction furnace, the reaction furnace configured to burn the acid gas feed, an oxygen source, and a fuel gas to create a furnace outlet stream, the reaction furnace comprises a main burner and a reaction chamber, the main burner is configured to heat the acid gas feed, the oxygen source, and the fuel gas to a minimum reaction temperature,
        wherein the minimum reaction temperature is between 1000° C. and 1250° C.,
        wherein the acid gas feed comprises hydrogen sulfide,
        wherein the hydrogen sulfide is converted to the elemental sulfur in the reaction chamber;
    a waste heat boiler fluidly connected to the reaction furnace, the waste heat boiler configured to capture heat from the furnace outlet stream to create a cooled stream,
        wherein the heat captured from the furnace outlet stream is operable to heat a water feed to create steam;
    a condenser fluidly connected to the waste heat boiler, the condenser configured to condense the cooled stream to produce a waste gas stream and a condensed stream,
        wherein the waste gas stream comprises sulfur-containing contaminants, and
        wherein the condensed stream comprises the elemental sulfur;
    a thermal oxidizer fluidly connected to the condenser, the thermal oxidizer configured to burn the waste gas stream, the oxygen source, and the fuel gas to create a sulfur dioxide rich stream,
        wherein a conversion of the sulfur-containing contaminants to sulfur dioxide is operable to occur in the thermal oxidizer,
        wherein the sulfur dioxide rich stream comprises the sulfur dioxide; and
    a sulfur dioxide scrubbing unit fluidly connected to the thermal oxidizer, the sulfur dioxide scrubbing unit configured to remove an amount of sulfur dioxide from the sulfur dioxide rich stream to create an effluent stream and a recycle stream, the recycle stream comprising the amount of sulfur dioxide,
wherein the recycle stream is recycled to the reaction furnace.

2. The sulfur recovery unit of claim 1, wherein the oxygen source is selected from the group consisting of air, oxygen enriched air, and pure oxygen.

3. The sulfur recovery unit of claim 1, wherein the cooled stream is at a temperature of 300° C.

4. The sulfur recovery unit of claim 1, wherein a temperature of the waste gas stream is between 125° C. and 150° C.

5. The sulfur recovery unit of claim 1, wherein the oxygen source provides a stoichiometric excess of oxygen in the thermal oxidizer, wherein the stoichiometric excess of oxygen promotes the conversion of the sulfur-containing contaminants to the sulfur dioxide.

6. The sulfur recovery unit of claim 1, wherein the amount of sulfur dioxide is greater than 99.9% by volume of the recycle stream.

7. The sulfur recovery unit of claim 1, wherein the recycle stream provides a stoichiometric ratio in the reaction furnace of the hydrogen sulfide to the sulfur dioxide of 2:1.

8. A sulfur recovery process to recover elemental sulfur from an acid gas feed, the sulfur recovery process comprising the steps of:
feeding the acid gas feed, an oxygen source, and a fuel gas to a main burner of a reaction furnace, the main burner configured to heat the acid gas feed, the oxygen source, and a fuel gas source to a minimum reaction temperature, the acid gas feed having hydrogen sulfide, wherein the minimum reaction temperature is between 1000° C. and 1250° C.;
converting the acid gas feed, the oxygen source, and the fuel gas at the minimum reaction temperature to create a furnace outlet stream, wherein the furnace outlet stream comprises the elemental sulfur and sulfur-containing contaminants;
recovering heat from the furnace outlet stream in a waste heat boiler to create a cooled stream, the waste heat boiler configured to capture heat from the furnace outlet stream to heat a water feed to create steam;
condensing the cooled stream in a condenser to produce a condensed stream and a waste gas stream, the condensed stream comprising the elemental sulfur, the waste gas stream comprising the sulfur-containing contaminants;
combusting the waste gas stream, the oxygen source, and the fuel gas in a thermal oxidizer to create a sulfur dioxide rich stream, the sulfur dioxide rich stream comprising sulfur dioxide, wherein a conversion of the sulfur-containing contaminants in the waste gas stream to the sulfur dioxide is operable to occur;
feeding the sulfur dioxide rich stream to a sulfur dioxide scrubbing unit, the sulfur dioxide scrubbing unit configured to remove an amount of sulfur dioxide from the sulfur dioxide rich stream to create a recycle stream and an effluent stream, wherein the recycle stream comprises the amount of sulfur dioxide; and
recycling the recycle stream to the main burner of the reaction furnace.

9. The sulfur recovery process of claim 8, wherein the oxygen source is selected from the group consisting of air, oxygen enriched air, and pure oxygen.

10. The sulfur recovery process of claim 8, wherein the cooled stream is at a temperature of 300° C.

11. The sulfur recovery process of claim 8, wherein a temperature of the waste gas stream is between 125° C. and 150° C.

12. The sulfur recovery process of claim 8, wherein the oxygen source provides a stoichiometric excess of oxygen in the thermal oxidizer, wherein the stoichiometric excess of oxygen promotes the conversion of the sulfur-containing contaminants to the sulfur dioxide.

13. The sulfur recovery process of claim 8, wherein the amount of sulfur dioxide is greater than 99.9% by volume of the recycle stream.

14. The sulfur recovery process of claim 8, wherein the recycle stream provides a stoichiometric ratio in the reaction furnace of the hydrogen sulfide to the sulfur dioxide of 2:1.

15. A sulfur recovery unit for processing an acid gas feed to recover elemental sulfur, the sulfur recovery unit consisting essentially of:
a reaction furnace, the reaction furnace configured to burn the acid gas feed, an oxygen source, and a fuel gas to create a furnace outlet stream, the reaction furnace comprises a main burner and a reaction chamber, the main burner is configured to heat the acid gas feed, the oxygen source, and the fuel gas to a minimum reaction temperature,
wherein the minimum reaction temperature is between 1000° C. and 1250° C.,
wherein the acid gas feed comprises hydrogen sulfide,
wherein the hydrogen sulfide is converted to the elemental sulfur in the reaction chamber;
a waste heat boiler fluidly connected to the reaction furnace, the waste heat boiler configured to capture heat from the furnace outlet stream to create a cooled stream,
wherein the heat captured from the furnace outlet stream is operable to heat a water feed to create steam;
a condenser fluidly connected to the waste heat boiler, the condenser configured to condense the cooled stream to produce a waste gas stream and a condensed stream,
wherein the waste gas stream comprises sulfur-containing contaminants, and
wherein the condensed stream comprises the elemental sulfur;
a thermal oxidizer fluidly connected to the condenser, the thermal oxidizer configured to burn the waste gas stream, the oxygen source, and the fuel gas to create a sulfur dioxide rich stream,
wherein a conversion of the sulfur-containing contaminants to sulfur dioxide is operable to occur in the thermal oxidizer,
wherein the sulfur dioxide rich stream comprises the sulfur dioxide; and
a sulfur dioxide scrubbing unit fluidly connected to the thermal oxidizer, the sulfur dioxide scrubbing unit configured to remove an amount of sulfur dioxide from the sulfur dioxide rich stream to create an effluent stream and a recycle stream, the recycle stream comprising the amount of sulfur dioxide,
wherein the recycle stream is recycled to the reaction furnace.

* * * * *